United States Patent

Kangas et al.

[11] Patent Number: 6,122,352
[45] Date of Patent: Sep. 19, 2000

[54] METHOD FOR CONTROLLING A CREDIT CUSTOMER CALL

[75] Inventors: Kari Kangas, Helsinki, Finland; John R. Banks, Bulkington, United Kingdom

[73] Assignee: Nokia Telecommunications Oy, Espoo, Finland

[21] Appl. No.: 09/329,805

[22] Filed: Jun. 10, 1999

Related U.S. Application Data

[63] Continuation of application No. PCT/FI97/00791, Dec. 16, 1997.

[30] Foreign Application Priority Data

Dec. 19, 1996 [FI] Finland ................................. 965134

[51] Int. Cl.$^7$ ..................................................... H04M 15/00
[52] U.S. Cl. .......................... 379/114; 379/111; 379/121; 379/144
[58] Field of Search ..................................... 379/111, 113, 379/114, 115, 121, 127, 130, 134, 143, 144, 196, 197, 199, 207, 229, 230

[56] References Cited

U.S. PATENT DOCUMENTS

| | | | |
|---|---|---|---|
| 5,148,474 | 9/1992 | Haralambopoulos et al. | 379/111 |
| 5,265,155 | 11/1993 | Castro . | |
| 5,408,519 | 4/1995 | Pierce et al. . | |
| 5,440,621 | 8/1995 | Castro . | |
| 5,448,628 | 9/1995 | Muroi et al. | 379/132 |
| 5,774,535 | 6/1998 | Castro | 379/144 |
| 5,862,203 | 1/1999 | Wulkan et al. | 379/114 |

FOREIGN PATENT DOCUMENTS

| | | | |
|---|---|---|---|
| 0 698 987 | 2/1996 | European Pat. Off. | H04M 15/18 |
| 0 794 651 | 9/1997 | European Pat. Off. | H04M 17/00 |

*Primary Examiner*—Curtis A. Kuntz
*Assistant Examiner*—Binh K. Tieu
*Attorney, Agent, or Firm*—Altera Law Group, LLC

[57] ABSTRACT

The invention relates to a method for controlling a credit customer call. Subscriber-specific accounts on which the subscribers can purchase connection time are kept at a centralized point of a telecommunications network. In order that tariff changes taking place on the connections may be observed in a simple way without causing a high instantaneous load on the network, a request (Initial_DP) requesting connection time for the use of the connection is sent to a centralized point (SCP) of the network. In response to the request, the balance of the account of said customer is checked at the centralized point of the network and the length of the connection time to be assigned to the connection per a request sent by the exchange is determined. When the balance of the account permits, a message (AC) including information (ST) on the length of the connection time assigned to the connection is sent in response to the request sent by the network exchange. During the connection, the network exchange monitors the elapsing of the connection time assigned per request, and when the assigned connection time is less than a specified threshold, an additional time request (ACR) requesting additional connection time is sent to the centralized point. Tariff changes are checked at least in connection with each discrete additional time request (ACR), and on the basis of the check, the length of the connection time to be assigned per a request sent by the exchange is redetermined, said message being retransmitted if the account balance permits. When the connection is terminated, the amount is adjusted in accordance with the actual moment of termination.

10 Claims, 4 Drawing Sheets

METHOD FOR CONTROLLING A CREDIT CUSTOMER CALL

This application is a continuation of PCT/FI97/00791 filed Dec. 16, 1997.

FIELD OF THE INVENTION

The invention relates generally to charging for connections in a telecommunications network, particularly to a service wherein subscriber-specific accounts are kept on which the subscribers may purchase prepaid connection time.

BACKGROUND OF THE INVENTION

Prior to an account of the prior art, some terms that relate to the description hereinbelow will be defined.

Charging information for a call, i.e. a tariff, refers to price information that relates to the charging rate or to the number of pulses in a pulse train, or both. This information must be available for calculation of the price for a call. The price information may be given as an amount per charging rate or an amount per pulse, for example. A charging rate in time charging again relates to the time between two successive metering pulses.

In modern telephone networks, it is possible to keep subscriber-specific accounts into which the subscriber may deposit money and thereby obtain prepaid call time. When the subscriber makes a call, the system decrements his account balance on the basis of the connection time spent. One advantage of such a service from the point of view of the operator is that the operator can avoid subscriber-related indebtedness, as it is possible not to allow calls when there are not sufficient funds in the account. On the other hand, from the point of view of the subscriber it is an advantage, for example, that a specified maximum amount that cannot be exceeded during a given period of time can be defined for the calling costs.

One system of the above-described kind is disclosed in U.S. Pat. No. 5,408,519. When a subscriber wishes to place a call, he dials the system number, whereafter the system prompts the subscriber to enter an account number and the destination telephone number. The system then calculates the cost per time unit of the call, and the maximum duration for a call to that destination, i.e., how long a call can be placed based on the current account balance. The system also allows the balance of the account to be increased with a credit card in connection with the call, or the system may automatically renew the account balance on a regular basis or each time the balance falls below a given amount. The system charges the increased amount using the credit card data of the subscriber.

If it is desired to maintain a service of the above kind in a telephone network on an exchange-specific basis, tariff data must be maintained at every exchange of the network, and tariff changes must be updated at each exchange.

This drawback can be resolved by keeping subscriber-specific accounts at a centralized point in the network. In that case, however, it will present a problem how tariff changes during the connections are observed in order for it to be possible to decrement the balance of the subscriber at the correct tariff in each case.

This problem could in principle be solved in such a way that when tariff changes are impending, the subscribers will not be granted connection time in accordance with the maximum time available in the account, but call time will only be granted up to the point of the tariff change, and thus the tariff change can be observed immediately when it takes effect. This means, however, that additional time must be given to each ongoing call (in the same tariff class) contemporaneously, which may produce a considerable instantaneous peak in the load on the system.

SUMMARY OF THE INVENTION

It is an object of the invention to eliminate the above-described drawbacks and to provide a method enabling a system that can be maintained as simply as possible to be created and permitting any instantaneous increase in the load as caused by a tariff change to be avoided.

This object is achieved with the solution defined in the independent patent claims.

The idea of the invention is to assign connection time for each connection in successive periods, one period at a time from a centralized point in the network, said point keeping subscriber-specific accounts. At the end of an individual period, the network exchange requests additional connection time for the connection if the connection is still switched. The possible tariff changes pertinent to the connection are checked in connection with the request in order to be able to continually observe the effect of the tariff changes in the balance of the account.

The tariff changes may be checked in advance or afterwards for each assigned connection time period.

The first of these alternatives means that it is checked in connection with a received connection time request whether a tariff change will take effect during the next period. By means of the tariff change check, it is ensured that the connection will not be assigned more connection time than the funds in the account suffice for. If it is found that a tariff change will take effect during the next period, the assigned length of the connection time period can be maintained if the funds in the account permit it. Alternatively, either more or less connection time can be assigned respectively, depending on what direction the tariff change will have, thus keeping the amount per period to be decremented from the account constant. The amount can be decremented from the account in advance at the beginning of each period, but it is preferable to do this after the period has expired, thus allowing the correct amount to be deducted also when the connection is terminated during a period. Neither will the subscriber suffer loss if the connection is cut off during a period, for example on account of failure.

The latter alternative, on the other hand, means that upon receipt of a connection time request, it is checked whether a tariff change has taken effect during the previous period. Herein the necessary adjustments and balance updates are made at the end of the period. In this case, the balance in the account may be negative, whereas in the first alternative this can be prevented.

On account of the solution in accordance with the invention, instantaneous peaks in the load can be avoided, as the network exchange need only request more connection time for a random number of connections. In other words, the load caused by tariff changes can be distributed over a longer time interval, as the period shifts will take place at different times on account of the fact that the connections have been set up at different times and the different connections may also have periods of varying length.

BRIEF DESCRIPTION OF THE DRAWINGS

In the following the invention and its preferred embodiments will be described in greater detail with reference to examples in accordance with the accompanying drawings, in which.

DETAILED DESCRIPTION OF THE INVENTION

As the method of the invention is implemented in an intelligent network, the intelligent network will be briefly described in the following.

A network architecture that provides advanced services is called an intelligent network. The common abbreviation for intelligent network is IN.

Figure 1:
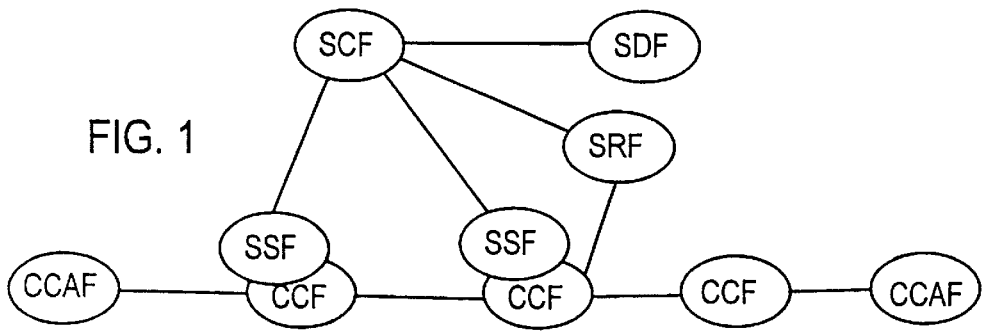
FIG. 1 illustrates the functional architecture of an intelligent network.

The functional architecture of an intelligent network is shown in FIG. 1 where the functional entities of the network are shown as ovals. This architecture is described briefly below, because the invention will be described later by referring to the intelligent network environment.

The access of the end user (subscriber) to the network is handled by the CCAF (Call Control Agent Function). The access to the IN services is implemented by making additions to existing digital exchanges. This is done by using the basic call state model BCSM which describes the existing functionality used to process a call between two users. The BCSM is a high level state automaton description of the call control functions CCF required for establishing and maintaining a connection route between users. Functionality is added to this state model by using the service switching function SSF (cf. the partial overlap of the entities CCF and SSF in FIG. 1) so that it is possible to decide when it is necessary to call the services of the intelligent network (the IN services). After these IN services have been called, the service control function SCF that contains the service logic for the intelligent network handles the service-related processing (of the call attempt). The service switching function SSF thereby connects the call control function CCF to the service control function SCF and allows the service control function SCF to control the call control function CCF. For example, SCF can request that the SSF/CCF performs specific call or connection functions, for example, charging or routing operations. The SCF can also send requests to the service data function SDF which handles the access to the services-related data and network data of the intelligent network. The SCF can thereby, for example, request the SDF to retrieve specific service-related data or update this data.

The functions described above are further complemented by the specialized resources function SRF which provides the special functions required for implementing some of the services provided by the intelligent network. Examples of these services are protocol conversions, speech recognition and voice mail. The SCF can, for example, request the SSF/CCF functions to first establish a connection between the end users and SRF and then it can request the SRF to give voice messages to the end users.

Other functional entities of the intelligent network are various functions that relate to control, such as the SCEF (Service Creation Environment Function), SMF (Service Management Function), and SMAF (Service Management Access Function). The SMF includes, among other things, service control, the SMAF provides the connection to the SMF, and the SCEF makes it possible to specify, develop, test and feed IN services via the SMF to the SCF. Because these functions only relate to the operation of the network operator, they are not shown in FIG. 1.

The role of the functional entities described in FIG. 1 as related to the IN services is described briefly below. The CCAF receives the service request given by the calling party. The service request usually consists of lifting the receiver and/or a series of digits dialled by the calling party. The CCAF further transmits the service request to the CCF/SSF for processing. The call control function CCF does not have the service data but it has been programmed to recognize the need of a service request. The CCF interrupts the call setup for a moment and notifies the service switching function SSF about the state of the call. The task of the SSF is, using predefined criteria, to interpret the service request and thus determine whether the request is a service request related to the IN services. If this is the case, the SSF composes a standardized IN service request and sends the request to the SCF along with information about the state of the service request. The SCF receives the request and decodes it. After that it cooperates with the SSF/CCF, SRF, and SDF to provide the requested service to the end user.

Figure 2:
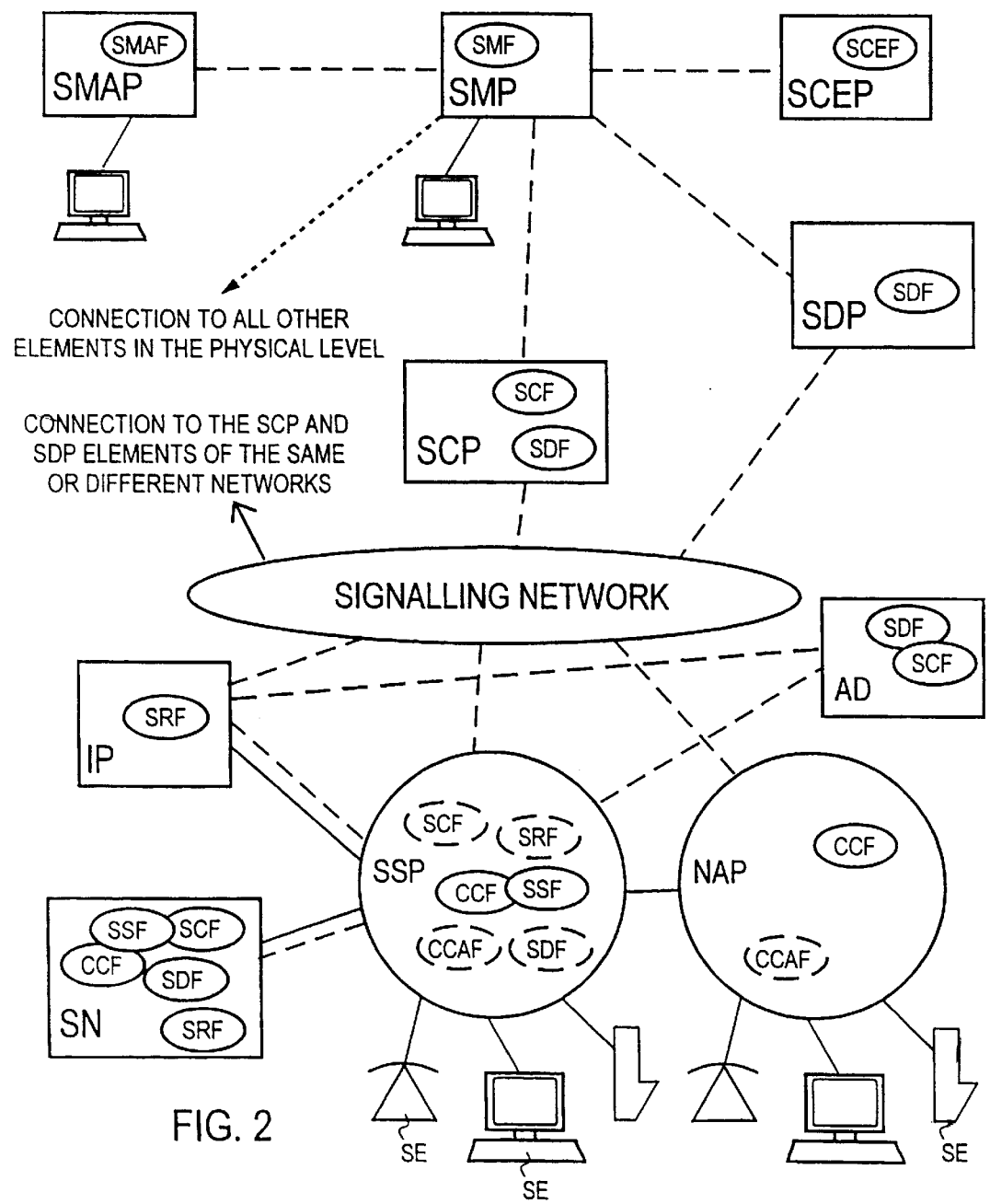
FIG. 2 illustrates the physical architecture of an intelligent network, FIGS. 3a . . . 3c illustrate the implementation of a credit service in an intelligent network.

The physical level architecture of the intelligent network describes how the functional entities described above are located in the physical entities of the network. The physical architecture of the intelligent network is illustrated in FIG. 2 where the physical entities are described as rectangles or circles and functional entities as ovals. The signalling connections are described by dashed lines and the actual transport which is, for example, speech, by continuous lines. The optional functional entities are marked by dashed line. The signalling network shown in the Figure is a network according to SS7 (Signalling System Number 7 is a well-known signalling system described in the CCITT (nowadays ITU-T) blue book *Specifications of Signalling System No. 7*, Melbourne 1988).

The subscriber equipment SE which can include, for example, a phone, computer, or a telefax, are connected either directly to a service switching point SSP or to a network access point NAP.

The service switching point SSP provides the user with access to the network and handles all necessary selection functions. The SSP can also detect any IN service requests. Functionally, the SSP includes the call control and service selection functions.

The network access point NAP is a traditional telephone exchange that includes the call control function CCF, for example, a DX 220 exchange which can differentiate calls that require IN services from traditional calls and route the calls that require IN services to the appropriate SSP.

The service control point SCP includes the service programs that are used to produce the IN services.

The service data point SDP is a database containing customer and network data which is used by the service programs of the SCP to produce tailored services. The SCP can use SDP services directly or via the signalling network.

The intelligent peripheral IP provides special services, such as announcements and voice and multiple choice recognition.

The service switching and control point SSCP consists of an SCP and SSP located in the same node (in other words, if the SSP node shown in the drawing contains both an SCF and an SSF entity, the node in question is an SSCP).

The tasks of a service management point SMP include the management of the database (SDP), network monitoring and testing, and collecting network data. It can connect to all other physical entities.

The service creation environment point SCEP is used for specifying, developing and testing the IN services, and for entering the services in SMP.

The service adjunct AD is functionally equivalent to the service control point SCP, but the AD is directly connected to SSP with a fast data connection (for example, with an ISDN 30B+D connection) instead of via the common channel signalling network SS7.

The service node SN can control the IN services and perform data transfers with users. It communicates directly with one or more SSPs.

The service management access point SMAP is a physical entity which provides certain users with a connection to SMP.

The above is a brief description of the intelligent network as a background to the description of the method according to the invention. Interested readers can get a more detailed description of the intelligent network in, for example, ITU-T specifications Q.121X or in the AIN specifications of Bellcore.

A wide variety of services can be offered in an intelligent network. These services include e.g. Freephone and account card calling (ACC).

A service of the kind described in the introduction may also be implemented in an intelligent network. In such a service, subscriber-specific accounts are kept each having a balance equivalent to a given amount or given connection time depending on how high a balance the subscriber has purchased by prepayment. In the following, implementation of this service in an intelligent network will be described. It should be mentioned, however, that reference to an intelligent network herein does not mean a network operating merely on a specific standard, but the idea of the invention can be implemented in any network architecture offering sophisticated services and having a centralized database that can be interrogated through a signalling network.

Figure 3A:
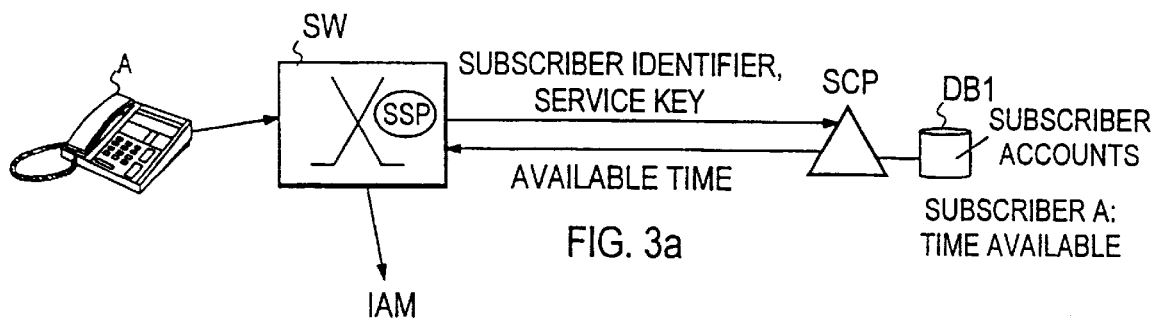

The call tariff information is usually located at a telephone exchange. In intelligent network applications it is possible, however, that the tariff data are stored at the SCP that handles the tariff change in the course of a call. FIGS. 3a . . . 3c illustrate the operation of such a service. SCP has a database DB1 comprising subscriber-specific account data.

FIG. 3a illustrates the start of the service. When subscriber A initiates a call, the SSP exchange SW recognizes the subscriber to be a credit customer and sends to the SCP a service request including subscriber identification data and a service key identifying the service. The SCP retrieves the account number on the basis of the identification data and checks whether subscriber A's account has sufficient funds for connection time to be assigned to the call. If this is the case, the SCP indicates to the SSP the duration of the connection time assigned on the basis of the service request, and the SSP continues processing the call in a known manner, transmitting an initiation message through the signalling network to the exchange of the B subscriber. This initiation message may be either an Initial Address Message (IAM), if the common channel signalling system utilizes the ISDN User Part ISUP, or an Initial Address Message with Additional Information (IAI), if the Telephone User Pat TUP is utilized. As a result of the initiation message, the terminal exchange of the called subscriber starts processing the call attempt in a known manner according to the (terminating) basic call state model.

Figure 3B:
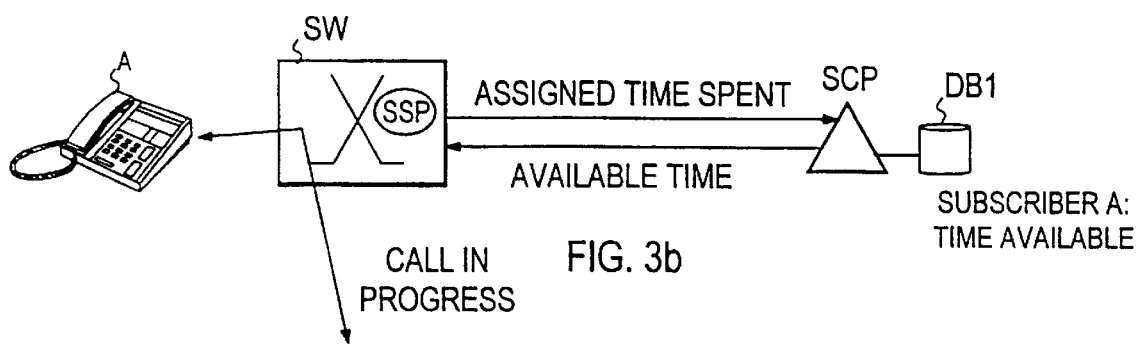

FIG. 3b illustrates the operation of the service during a call. The call control of the SSP exchange monitors the elapsing of the connection time assigned by the SCP, and if the connection time expires and the call is still in progress, the SSP exchange sends to the SCP a message indicating that the available time is running out and requesting additional time. In response to the message, the SCP checks whether subscriber A's account balance is still sufficient for the call to be allowed to continue. If this is the case, the SCP indicates the new available connection time to the SSP, which again starts monitoring the elapsing of said time. In this way, the SCP assigns connection time in successive periods.

Figure 3C:
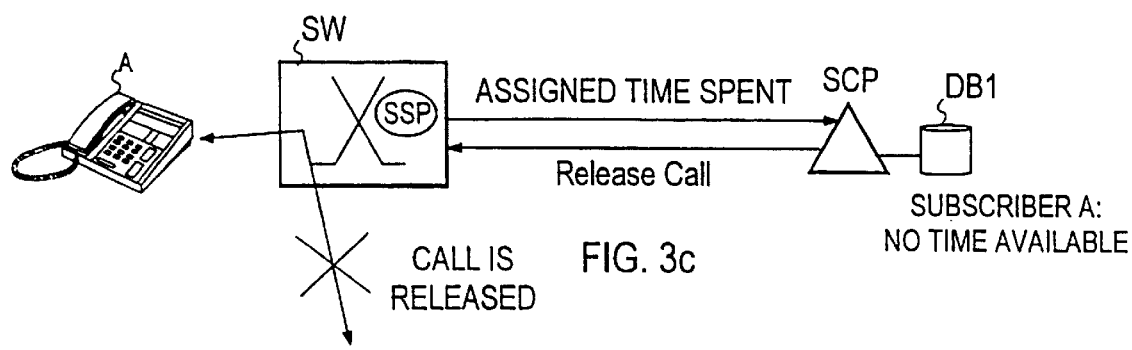

FIG. 3c illustrates a situation where the limit of the account is reached. When the SSP informs the SCP that the connection time assigned to the connection is running out or has expired, the SCP may find that the subscriber account no longer has sufficient funds or the balance is negative. In that case, the SCP sends to the SSP a standard Release Call message wherewith the connection may be released at any phase thereof. The message contains a code indicating the release method.

Figure 4:
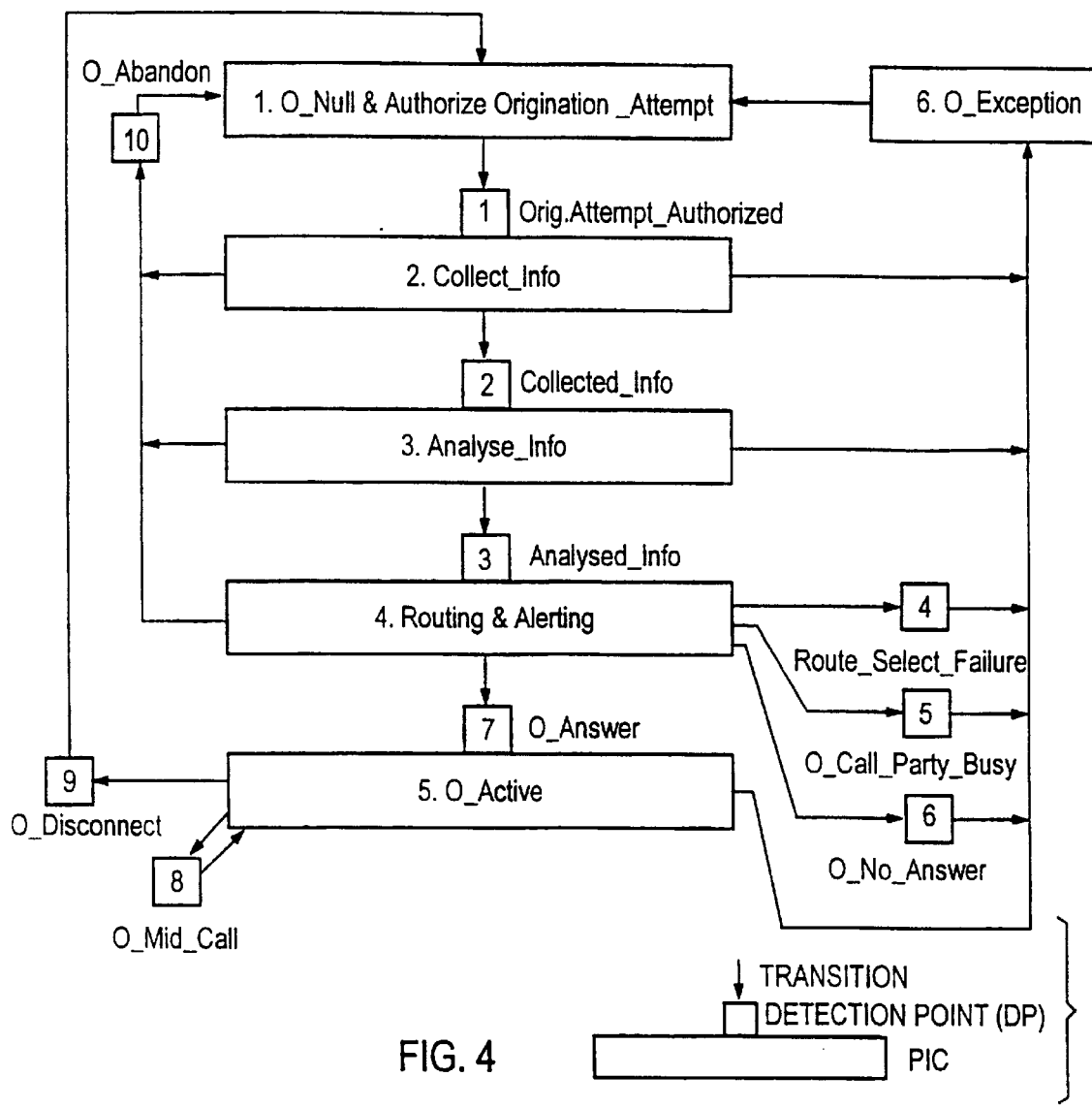
FIG. 4 illustrates the call state model associated with the calling party.
Figure 5:
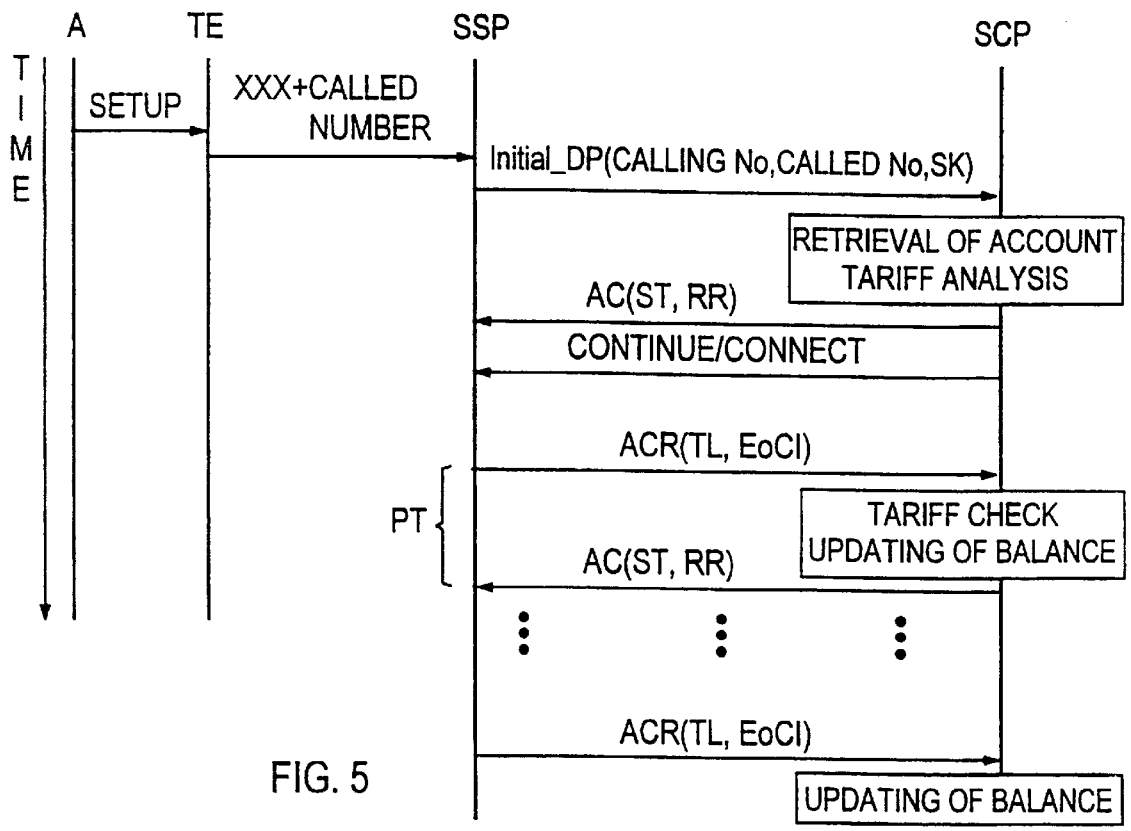
FIG. 5 illustrates the message exchange conducted in the method of the invention.

The method of the invention will be described below by following the progress of a call attempt made by an account service subscriber A by means of FIGS. 4 and 5. FIG. 4 shows the Originating Basic Call State Mode O_BCSM and FIG. 5 message transfer between the network elements insofar as it pertains to the invention.

The parts of the basic call state model are points in call PIC, detection points DP, transitions, and events. The PICs identify the functions of the call control function CCF that are required to complete one or more calls/connection states. The DPs indicate the points in the calling and connection procedure at which the control can be passed to the intelligent network. (The figure shows each detection point denoted with a name; in the ETSI (European Telecommunications Standards Institute) standards, the names pertain to the actual detection points, whereas in the ITU-T standards they pertain to the messages that the service switching function SSF sends to the SCP from that detection point). The transitions indicate the normal flow of the call/connection process from one PIC to another. The events cause transitions into the PIC and out of the PIC.

The entry event of PIC 1 (O_Null & Authorize_Origination_Attempt) at the SSP exchange is release of the preceding connection (DP 9 or DP 10). The function consists of setting of the connection to the idle state and checking of the rights of the calling party (the right of the calling party to make a call having the given attributes is checked). When the rights (of subscriber A) have been verified, initial information is collected in PIC 2 from the calling party. This information includes for example service codes and called numbers.

At network level (FIG. 5), the above is reflected in that the terminal exchange TE of the subscriber first receives information on the calling subscribers desire to place a call. This information may arrive at the exchange for example as a Setup message in accordance with standard Q.931. FIG. 5 presupposes that the terminal exchange is not an SSP exchange, and thus it recognizes the subscriber (i.e., the calling number) to be a credit customer and sends information to that effect to the SSP exchange. This may be effected for example in such a way that the terminal exchange inserts a prefix XXX of a given length into the called number (B number), allowing the SSP exchange to recognize that the customer is a credit customer.

Recognition of credit customer calls at the SSP exchange may also be implemented by other means, e.g. by assigning dedicated circuits for this purpose, the calls being routed to these circuits each time a credit customer is concerned. In that case, the SSP exchange will recognize all calls arriving through these circuits as calls placed by credit customers.

Thereafter, the call control at the SSP exchange will proceed to PIC 3, in which the information obtained is analyzed to determine the routing address and call type. If it is detected at this stage that the customer has an account in the account database of the SCP, passing of control to the intelligent network is triggered at DP 3 and processing of the call attempt is "frozen". The SSP exchange then sends to the SCP an Initial_DP message (standard message between SSF and SCP, generated by the SSF upon detection of a service request at any DP of the call state model), including as its information elements at least the calling and called numbers and a service key denoted by reference SK in FIG. 5.

Having received the service request, the SCP recognizes from the service key that credit customer service is concerned. In that situation, the SCP first checks whether the calling number is to be found in the database, i.e. whether a credit customer is concerned, and what the balance of the account is. If the account does not have (sufficient) funds, there are several alternatives. For example, the call can be disconnected immediately, or the SSP can be instructed to route the call to an operator service number announcing the caller about the insufficient account balance before the connection is released.

In normal cases, however, there will be sufficient funds in the account, and thus the SCP carries out a tariff analysis for the connection on the basis of the calling and called numbers. This may take place for example in such a way that the tariff class of said connection is first determined on the basis of the calling and called numbers (or parts thereof. On the basis of the tariff class, the tariff look-up table in the database will indicate how much the call will cost per time unit. On the basis of this information and the account balance, the SCP makes a decision on the length of the connection time that can be assigned to the connection per one connection time request. The assigned connection time may also be a predetermined constant, wherefrom exceptions are made only if the account balance is not sufficient to cover such time, in which case for example a connection time equivalent to the entire balance can be assigned to the connection. The value of the constant may be specific to the tariff class, for instance.

Thereafter the SCP sends to the SSP a standard Apply_Charging message (AC, FIG. 5), in which it includes an information element indicating to the SSP the available connection time in seconds, for example. This information element is denoted by reference ST in FIG. 5. The information may also be included in pulses or monetary units in the message. Furthermore, the SCP inserts into the message an information element RR (Report Request) requesting a report in response to the Apply_Charging message at the end of the available connection time. In practice, the length of the connection time assigned at one time may be a few minutes, and the duration of the assigned connection time need not be dependent on the balance of the account (except in the case that the balance is so low that all connection time must be assigned at one time or no connection time can be assigned).

After this first Apply_Charging message, the SCP additionally transmits either a CONTINUE message or a CONNECT message as specified in the standards, depending on the desired way of proceeding with the call attempt. With a CONNECT message, the SCP requests the SSP to route the call to the desired destination or to forward the call to another destination. In that case, the processing of the call attempt returns to PIC 3, at which a new digit analysis is made on the (new) number received from the SCP; thereafter the processing of the call attempt proceeds to PIC 4. With a CONTINUE message, the SCP prompts the SSP to continue with the interrupted processing of the call attempt on the basis of existing call data, in which case the processing of, the call attempt proceeds directly to PIC 4. The CONNECT or CONTINUE message is thus sent only once for any given connection.

From this point onward, the call control proceeds in the known manner, and thus for example call routing is performed at PIC 4. Starting information is sent to the terminating basic call state model, and the call control is passed to the terminating half. The entry event of PIC 5 is constituted by an indication from the terminating basic call state model that the called party has answered the call. The function at PIC 5 consists of connection establishment between the calling and called parties and collection of charging data. Exit events include a service request obtained from the calling party (DP 8), information on the fact that either the calling party or the called party has disconnected the call (DP 9), or occurrence of an error situation (transfer to PIC 6, at which errors and exceptional situations are handled).

Hence, when the call is in progress the call control of the calling party is at PIC 5. In that situation, the call control of the SSP exchange monitors the elapsing of the connection time assigned by the SCP. If the connection time assigned by the SCP is running out and the call is still in progress, the SSP sends to the SCP a standard Apply_Charging_Report message. This message is a response to the Apply_Charging message sent by the SCP. The SSP includes in the message information (TL) on the remaining connection time. The message additionally contains an end of call indicator parameter (EoCI) indicating whether the last Apply_Charging_Report message for the connection is concerned or not.

If the account balance is still sufficient, the SCP sends to the SSP a new Apply_Charging message indicating the available connection time in seconds, for example, and including a request to respond with a report. In this way, the SSP obtains connection time for the use of the connection in successive periods.

Depending on the load on the SCP, it may take some time before the SSP receives a response to the request for additional connection time it has sent. This time can be taken into account at the SSP, for instance, by observing that the processing time (PT) used for obtaining a response has already been utilized from the time that the SCP assigned for the use of the connection. Another alternative is that the SCP decrements the time elapsed from the request to the issue of a response, already used by the connection at that stage, from the connection time to be assigned at one time.

The above-described periodical assignment of connection time is further combined with maintenance of the account balance. There are two basic alternatives herein, depending on at which stage possible tariff changes are studied and the account is decremented.

In the first basic alternative, the SCP studies before the sending of each Apply_Charging message whether a tariff change will take effect during the next period. If this is the case, the tariff change is taken into account and either the amount to be decremented at a time is adjusted in accordance with the tariff change, in which case the connection time to be assigned at a time will remain the same, or the length of the connection time to be assigned at a time is adjusted in the direction of the tariff change, for example in such a way that the amount per period to be decremented from the account will remain constant. If the charge for the call increases, the balance of the account will not necessarily allow the assigned connection time to remain unchanged, but the connection time to be granted must be reduced. Thus the account balance cannot be negative.

Even though in the first alternative a possible tariff change is studied in advance at the start of each period, it is preferable to decrement the amount from the account at the end of the period, in which case the correct amount can be decremented immediately, and the subscriber will suffer no financial loss if the connection should be cut off during the period on account of failure or the like.

In the second alternative, studying a tariff change and decrementing an amount equivalent to the spent connection time from the account are both carried out at the end of the period. FIG. 5 illustrates this alternative, in which the tariff check and updating of the balance are carried out after an additional time request (ACR) has been received from the SSP. Thus, the tariff check is not made in connection with the original tariff analysis, as in the first alternative.

Since in this case the tariff change is not observed until the end of the period, it is possible that the account balance becomes zero or negative. In that event, the call may be disconnected or, for example, calls of certain customers may be allowed to continue even though the account balance is negative. New calls can be barred, on the other hand, if the account balance is negative.

Since the subscribers presumably terminate the connection in the middle of a period, the account balance must be adjusted to correspond to the actual point of termination. When the connection has been cut off, the SSP still sends a last Apply_Charging_Report message, including information on the unused connection time. In this case, the EoCl parameter of the message has the value true, as the last Apply_Charging_Report message for the connection is concerned. On this basis, the SCP updates the account balance to the correct value.

Figure 6A:
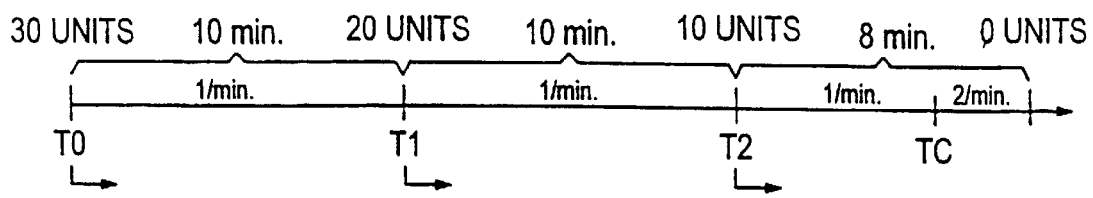
FIGS. 6a and 6b depict time axes illustrating the principle of the invention.
Figure 6B:
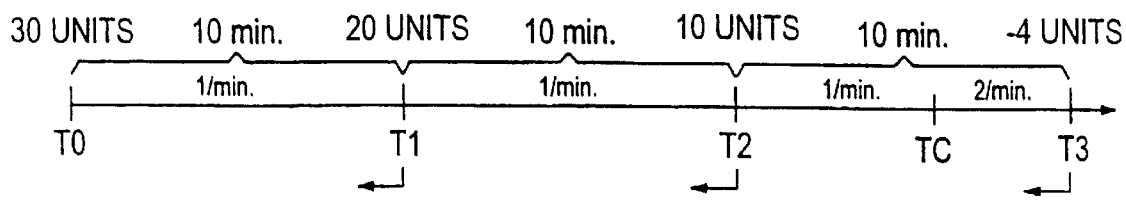

FIGS. 6a and 6b illustrate assigning of connection time in accordance with the invention by depicting three successive connection periods on a time axis. The call is initiated at moment T0, at which moment there are 30 monetary units in the account of the calling subscriber in this exemplary case.

Let it further be assumed that the current tariff at that moment is 1 monetary unit per minute, and that at moment TC (TC=T0+26 min.) a tariff increase to 2 monetary units per minute will take effect. On the basis of the tariff analysis performed at the beginning of the call, the SCP decides to assign 10 minutes of connection time at a time. Since there are still funds in the account at the next period shift (moment T1), 10 minutes of connection time will again be assigned. The next time the SSP requests additional time (moment T2), the length of the connection period to be assigned is dependent on whether the tariff change check is made at the beginning or at the end of the period. Arrows pointing in the direction of the connection period to be checked have been drawn at the check moments in the figure.

If the check is made at the beginning of each period (FIG. 6a), the SCP detects at moment T2 that at moment TC (TC=T2+6 minutes) a tariff change to 2 monetary units per minute will take place. In consequence, the SCP assigns only 8 minutes for the use of the connection, as thereafter the account balance will be zero. If the check is made only at the end of the period (FIG. 6b), the SCP detects at moment T3 that the account balance is negative by 4 monetary units as the tariff was increased at moment TC.

Even though the invention has been described in the above with reference to the examples in accordance with the accompanying drawings, it is obvious that the invention is not to be so restricted, but it can be modified within the scope of the inventive idea set forth in the appended claims. It is possible, for example, to keep account data at another centralized point of the intelligent network than the SCP, for example in an adjunct (AD).

What is claimed is:

1. A method for controlling a credit customer call, in accordance with which method subscriber-specific accounts on which the subscribers can purchase connection time are kept at a centralized point of a telecommunications network, when a subscriber terminal communicates through the network with another terminal, the account balance is decremented on the basis of the duration of the connection, characterized in that (a) when a connection establishment attempt from a customer having an account at a network exchange is detected, a request (initial_DP) requesting connection time for the use of the connection is sent to a centralized point (SCP) of the network, (b) in response to the request, the balance of the account of said customer is checked at the centralized point of the network and the length of the connection time to be assigned to the connection per a request sent by the exchange is determined, (c) when the balance of the account permits, a message (AC) including information (ST) on the length of the connection time assigned to the connection per request is sent in response to the request sent by the network exchange, (d) during the connection, the network exchange monitors the elapsing of the connection time assigned per request, and when the assigned connection time is less than a specified threshold, an additional time request (ACR) requesting additional connection time is sent to the centralized point, (e) tariff changes are checked at least in connection with each discrete additional time request (ACR), and on the basis of the check the length of the connection time to be assigned per a request sent by the exchange is redetermined, said message being retransmitted if the account balance permits, and (f) when the connection is terminated, the amount is adjusted in accordance with the actual moment of termination.

2. A method as claimed in claim 1, characterized in that the tariff changes are checked in advance by studying in connection with the request sent by the exchange whether tariff changes will take effect during a predetermined period of time following the request.

3. A method as claimed in claim 2, characterized in that the effect of the tariff change is taken into account by adjusting the amount to be decremented from the account, the length of the connection time to be assigned per request being kept constant at least as long as the account balance covers a connection time having the length of said constant.

4. A method as claimed in claim 2, characterized in that the effect of the tariff change is taken into account by adjusting the length of the connection time to be assigned in response to the request.

5. A method as claimed in claim 2, characterized in that the tariff changes are checked afterwards by studying in connection with the request sent by the exchange the tariff changes that have taken effect between said request and the preceding request, whereby the tariff changes are taken into account in the current balance of the account.

6. A method as claimed in claim 5, characterized in that the connection is released if it is found in connection with the check that the account, balance has become negative as a result of a tariff change.

7. A method as claimed in claim 1, characterized in that in connection with the request sent by the exchange, an amount corresponding to the connection time between said request and the preceding request is decremented from the account.

8. A method as claimed in claim 1, characterized in that an additional time request is sent when the assigned connection time has elapsed entirely.

9. A method as claimed in claim 1, characterized in that the connection time to be assigned is determined by giving the connection time a predetermined constant value whenever the balance of the account is sufficient to cover a connection time having the length of said constant.

10. A method as claimed in claim 9, wherein the connections are classified into different tariff classes, characterized in that the same constant value is used at least for the connections belonging to the same class.

\* \* \* \* \*